Dec. 6, 1960 G. TARBUTTON ET AL 2,963,344
ALKALINE PROCESS FOR THE MANUFACTURE OF CRYOLITE
Filed Oct. 13, 1958
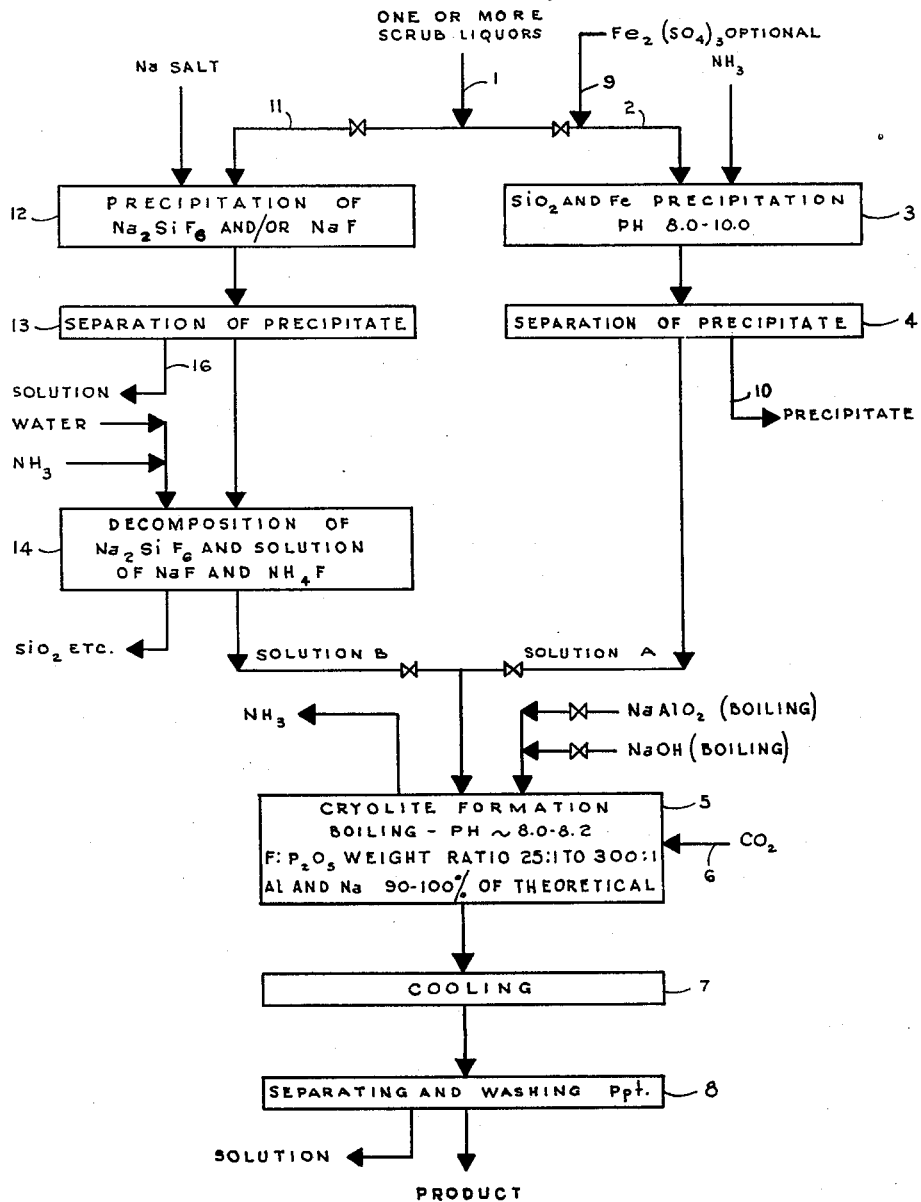

2,963,344

ALKALINE PROCESS FOR THE MANUFACTURE OF CRYOLITE

Grady Tarbutton, Thad D. Farr, and Thomas M. Jones, Sheffield, and Harry T. Lewis, Jr., Florence, Ala., assignors to Tennessee Valley Authority, a corporation of the United States Filed Oct. 13, 1958, Ser. No. 767,073

2 Claims. (Cl. 23—88)

(Granted under Title 35, U.S. Code (1952), sec. 266)

The invention herein described may be manufactured and used by or for the Government for governmental purposes without the payment to us of any royalty therefor.

This invention is an improved method for the manufacture of cryolite, $Na_3AlF_6$. It is particularly valuable for the preparation of cryolite from fluorine contained in waste gases evolved in processes in the phosphate industry. Such gases contain fluorine and phosphorus compounds, together with congeneric impurities. These impurities may be compounds of silicon and iron, oxides of sulfur, oxides of carbon, and entrained solid or liquid particles.

Fluorine is evolved in the processing of phosphate rock and related processes as hydrogen fluoride, silicon tetrafluoride, or a mixture of the two gases. It is estimated that about 100,000 tons of fluorine was evolved in processing about 11,000,000 tons of phosphate rock in the United States in 1955. The effluent gases usually are dilute with relation to fluorine compounds, and they may contain phosphorus compounds, carbon dioxide, oxides of sulfur, water vapor, and entrained solid and liquid particles. The development of processes for the recovery of useful fluorine compounds from such gases has been handicapped by the low concentration of fluorine and the associated contaminants.

It is known that fluorine compounds can be removed readily from gases evolved in processing phosphate rock by scrubbing the gases with slightly acidic aqueous ammonium fluoride. Scrub liquor is recycled, and its acidity is controlled by adding ammonia. Hydrogen fluoride dissolves and reacts with ammonia in the aqueous solution to form ammonium fluoride. Silicon tetrafluoride dissolves in aqueous ammonium fluoride to form a solution of ammonium fluosilicate. In contrast, when silicon tetrafluoride is scrubbed with water, about one-third of the silica precipitates in a gelatinous form and two-thirds dissolves to form fluosilicic acid. By keeping the scrubbing solution slightly acidic (pH 5 to 6), carbon dioxide is not absorbed, the absorption of sulfur dioxide is limited, and the solution is not highly corrosive. Moreover, the partial pressure of ammonia over such solutions is low and little ammonia is lost in the scrubbing operation.

In the production of elemental phosphorus by the electric-furnace process, phosphorus vapor is condensed by cooling with recycled aqueous spray liquor. To minimize corrosion in the condensor system, where acid is formed, an alkaline agent is added to the liquor. When ammonia is used for this purpose, fluorine evolved from the electric furnace is absorbed to form ammonium fluosilicate and ammonium fluoride. The condenser liquor also contains phosphorus compounds and solids.

The weight ratio $F:P_2O_5$ in liquors obtained by scrubbing effluent gases from phosphate-rock processing plants and the like with slightly acidic ammonium-fluoride solutions varies widely. For example, recycled liquor (pH maintained in the range from 5.0 to 6.0 by adding ammonia) used for condensing phosphorus from electric-furnace gas was found to contain fluorine and phosphorus pentoxide in weight ratios $F:P_2O_5$ ranging from 1.4 to 1.8. The liquor formed by scrubbing nodulizing kiln effluent gas had weight ratios $F:P_2O_5$ ranging from 10 to 30, and the liquor formed by scrubbing the effluent gas from a calcium metaphosphate fertilizer furnace had weight ratios $F:P_2O_5$ in the range from 6 to 8. When gases evoved in the manufacture of superphosphate are scrubbed with a slightly acidic solution of ammonium fluoride, the weight ratio $F:P_2O_5$ in the liquor may be 100 or higher.

One larger producer of aluminum sets the following specifications for synthetic cryolite:

Fluorine content at least 85 percent of that represented by the formula $Na_3AlF_6$.
    Maximum limits of impurities:
        $P_2O_5$, 0.1 percent
        $SiO_2$, 0.6 percent
        $Fe_2O_3$, 0.25 percent
        $SO_3$, 5 percent.

The term "specification-grade cryolite" is used in this specification and subtended claims to mean cryolite conforming to the above specifications.

It is an object of our invention to provide a process for the production of cryolite, $Na_3AlF_6$, of purity at least as high as that required to meet the specifications given above from byproduct fluorine scrub liquors contaminated with phosphorus.

Another object is to provide such process which is applicable to scrub liquors having a wide range of $F:P_2O_5$ ratios.

Another object is to provide such process in which a high percentage of fluorine is recovered.

Still another object is to provide a process of the above type which is cheap and simple in operation and for which equipment costs are not excessive.

Other objects and advantages will be apparent from the description given below.

We have found that cryolite of specification grade may be prepared by precipitation from a solution containing fluorine, phosphorus compounds, silicia, and iron in such proportions that the $F:P_2O_5$ weight ratio is in the range from 25:1 to 40:1, the $F:SiO_2$ weight ratio is at least 60:1, and the $F:Fe_2O_3$ weight ratio is at least 100:1. Also, we have found that the proportion of sulfate is immaterial. Large quantities of sulfate may be present without contaminating the precipitate excessively.

Briefly, our process comprises introducing sodium aluminate and sodium hydroxide into a boiling solution containing fluorine, phosphorus compounds, silicia, and iron in such proportions that the weight ratio $F:P_2O_5$ is in the range from 25:1 to 400:1, the weight ratio $F:SiO_2$ is at least 60:1, and the weight ratio $F:Fe_2O_3$ is at least 100:1; controlling the quantities of sodium and aluminum added in the range from 90 to 100 percent of the quantities theoretically required to form $Na_3AlF_6$ with all fluorine present in the solution; neutralizing the solution to about the phenolphthalien end point by addition of carbon dioxide; cooling the solution; separating a resulting precipitate of $Na_3AlF_6$; washing the precipitate and receiving a precipitate of specification grade.

The attached drawing is a flow sheet illustrating a process conducted according to our invention. In the drawing the reference numeral 1 indicates a scrub liquor from one or more processes in the phosphorus industry led into the system. Such scrub liquor may contain all the impurities mentioned above, but the most difficult impurities to separate from fluorine are phosphorus compounds. The entering scrub liquor is treated in the process illustrated by one of three modifications. Which of these modifications is used in preliminary steps depends upon the $F:P_2O_5$ weight ratio in the incoming scrub liquor.

When the $F:P_2O_5$ weight ratio is 25:1 to 400:1, it may be sent through line 2 to a silica-and-iron precipitation step 3. In this step, sufficient ammonia is added to the scrub liquor at room temperature to bring the pH into the range from about 8 to 10, preferably about 8.5 to 9. We have found that a precipitate of excellent filterability results when this step is carried out at room temperature. Silica and iron precipitate, and the precipitate occludes and carries down any solid particles that may be present in the liquor. Under these conditions most of the silica and iron are precipitated, but usually not more than 12 to 15 percent of phosphorus and very little of the fluorine are precipitated.

In one case in which we ammoniated a scrub liquor to pH9 in this step, a material balance showed that 96 percent of the silica, 72 percent of the ferric oxide, 13 percent of the phosphorus pentoxide, and less than 1 percent of the fluorine present were precipitated.

The material is then passed to a precipitate-separation step 4, which may be conducted by centrifuging, decanting, or filtration. Of these, filtration is the preferred method. A precipitate is separated and discarded as indicated by line 10, leaving a solution designated solution A in the drawing containing substantially all fluorine and 85 percent or more of the phosphorus originally present. This solution A is low in silica and iron content, although it may contain considerably more of these material than is permitted by the specifications for cryolite product. The weight ratio of $F:P_2O_5$ in the solution at this point will be somewhat above that of the scrub liquor because of precipitation of a small amount of phosphorus in step 3.

Solution A is passed to a cryolite-formation step 5, where it is heated to boiling, and hot sodium aluminate and sodium hydroxide solutions, preferably at boiling temperature, are introduced in proportions to bring the sodium and aluminum contents of the solution into the range from 90 to 100 percent of the proportions theoretically required to form $Na_3AlF_6$ with all fluorine present according to the equation

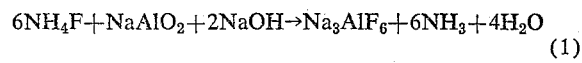

$$6NH_4F + NaAlO_2 + 2NaOH \rightarrow Na_3AlF_6 + 6NH_3 + 4H_2O \quad (1)$$

The ammonia liberated is recovered and may be returned to the scrubbing step of the process. Carbon dioxide is then admitted slowly through line 6 in quantity sufficient to lower the pH of the solution to about phenolphthalein end point, i.e., about pH 8.

The mixture is then cooled, preferably to room temperature, and is passed to a precipitate-separation step 8. Here the precipitate is separated, preferably by filtration, and it is then washed as shown at 8. The product withdrawn is cryolite of specification grade.

We have demonstrated that the process described above can be used to make specification-grade cryolite from solutions in which the $F:P_2O_5$ weight ratio is as low as 25:1. Our results indicate also that the process could be used when the $F:P_2O_5$ weight ratio is below 25:1; but less than 90 percent of the stoichiometric amounts of sodium and aluminum could be used, however with resultant lower conversion of the fluorine to cryolite.

We prefer to operate with solutions in which the $F:P_2O_5$ weight ratio is higher, say at least 50:1. When the ratio is well above 25:1, larger proportions of sodium and aluminum can be used, resulting in the recovery of larger portions of the fluorine as specification-grade cryolite.

When the $F:P_2O_5$ weight ratio is in the range of 25:1 to 40:1, only 90 percent of the stoichiometric amounts of sodium and aluminum required by Equation 1 may be used, and about 85 percent of the fluorine is recovered as specification-grade cryolite. When the $F:P_2O_5$ weight ratio is 125:1 or higher, 100 percent of the stoichiometric amounts of sodium and aluminum may be used, and about 94 percent of the fluorine is recovered as specification-grade cryolite containing fluorine equivalent to 94 to 97 percent $Na_3AlF_6$.

We have found that the $F:P_2O_5$ weight ratio in slightly acidic (pH 5 to 6) solutions can be raised from 25:1— or from even lower ratios, say 10:1—to 50:1 or higher by preferentially precipitating a part of the phosphate as $FePO_4$. About 85 percent of the phosphate is removed when twice the stoichiometric quantity of ferric sulfate required to form $FePO_4$ with the phosphate is added to slightly acidic scrub liquor containing about 30 grams of fluorine and about 3 grams of $P_2O_5$ per liter, thereby increasing the $F:P_2O_5$ weight ratio from 10:1 to about 60:1. The ferric sulfate may be introduced via line 9 and the process continued by the steps 3, 4, 5, 7, and 8 just described.

The excess iron is precipitated along with silica in step 3 and is discarded. No exact lower limit can be set on the use of ferric sulfate in this step. The lower limit of weight ratio of $F:P_2O_5$ that can be raised to 25:1 is set by economics and not by chemistry. It may be found uneconomical to use sufficient ferric sulfate when the weight ratio of $F:P_2O_5$ is far below 25:1.

Alternatively, when the $F:P_2O_5$ weight ratio in the scrub liquor is below 25:1, i.e., anywhere in the range from 1:1 to 25:1, we prefer to pass the solution, after removing solids, via line 11 to a sodium silico-fluoride and sodium fluoride precipitation step 12. This precipitation is conducted by merely introducing an excess of a sodium salt, such as sodium chloride, into the scrub liquor. The resulting precipitate of sodium silicofluoride and sodium fluoride is separated from the solution in separation step 13, and the precipitate is passed to a sodium silicofluoride decomposition step 14. The solution separated from the precipitate in step 13 may contain sufficient phosphorus and ammonia to make their recovery worth while. It is withdrawn from the system via line 16 to phosphorus and ammonia recovery, or to waste.

In step 14, aqueous ammonia is introduced and mixed with the precipitate in quantity sufficient to decompose all sodium silicofluoride present and to dissolve any sodium fluoride and ammonium fluoride present or formed in the reaction. A precipitate of silica is formed in this step. It is separated from the solution of sodium and ammonium fluorides and may be discarded.

The resulting solution, designated solution B, is low in silica and iron and has a weight ratio $F:P_2O_5$ well in excess of 50:1, usually above 150:1. This solution is then passed to the cryolite-formation step 5 and is treated as described above.

The resulting mixture of solution and precipitate is cooled and is passed to separation and washing step 8. Specification-grade cryolite is consistently obtained as product.

When the scrub liquor has a weight ratio $F:P_2O_5$ somewhat below 25:1, for example 15:1, the incoming stream of scrub liquor may be divided and a part of it sent via line 2 to silica-and-iron precipitation step 3 to form solution A. This solution will have a weight ratio $F:P_2O_5$ below 25:1, but it may be raised to 25:1 or more by combination with solution B resulting from treating another portion of scrub liquor via line 11 to precipitation step 12, followed by steps 13 and 14. The proportions of scrub liquor sent via lines 2 and 11 are selected so that the $F:P_2O_5$ weight ratio in the solution resulting from the combination of solution A and solution B will have a weight ratio $F:P_2O_5$ above 25:1, and preferably above 50:1.

The cryolite-formation step is then conducted as described above. The resulting mixture is cooled, and the product is separated and washed.

The following examples illustrate specific application of our process.

*Example I*

Waste gases evolved from a commercial-scale phosphate-rock nodulizing kiln were scrubbed with recycled aqueous scrub liquor maintained in the range from pH 5.0 to 6.0 by adding aqueous ammonia. Fresh water was added to the system as needed to maintain a constant volume of scrubber liquor. The temperature in the scrubber was about 65° C.

The resulting liquor (6,000 gallons) contained about 4 percent solids. The solution phase contained, in grams per liter; F. 30.7; $SiO_2$, 10.5; $P_2O_5$, 1.15; S. 17.2; $Fe_2O_3$, 0.7; $Al_2O_3$, 0.3; $K_2O$, 0.2; and CaO, 0.1. The silica came largely from the silicon tetrafluoride in the gas, about 40 percent of the fluorine being in this form. The sulfur (sulfate and sulfite) came mostly from coal used as fuel in the process.

A portion of the scrubber liquor was adjusted to pH 9 with ammonia and then filtered at room temperature. The filtrate was concentrated in glassware to about half its original volume to yield stock solution I (weight ratio, $F:P_2O_5$, 40; composition, grams per liter: F, 52.0; $P_2O_5$, 1.3; $SiO_2$, 1.2). Another portion of the scrubber liquor was treated with ferric sulfate in excess of that required to form $FePO_4$ with all the phosphorus pentoxide present, adjusted to pH 9 with ammonia at room temperature, and filtered to give stock solution II (weight ratio, $F:P_2O_5$, 330; composition, grams per liter: F, 33.0; $P_2O_5$, 0.1; $Fe_2O_3$, 0.02).

The alkaline cryolite method described above was carried out on bench scale with solutions whose $F:P_2O_5$ weight ratios ranged from 25:1 to 330:1 as prepared from stock solutions I or II, with or without additions of ammonium phosphate solution. Aluminum and sodium ions were added in proportions ranging from 90 to 103 percent of the requirements of Equation 1.

The results tabulated below show that sodium cryolite meeting the specifications for phosphorus content was prepared from kiln gas scrubber liquor (a) with weight ratios $F:P_2O_5$ of 25:1 or higher by using 90 percent of the theoretical quantities of aluminum and sodium, (b) with weight ratios $F:P_2O_5$ of 50:1 or higher by using 95 percent of the theoretical quantities of aluminum and sodium, (c) with weight ratios $F:P_2O_5$ of 125:1 or higher by using the theoretical quantities of aluminum and sodium. The results also indicate that specification-grade sodium cryolite may be prepared from liquors with high $F:P_2O_5$ weight ratios—of the order of 300:1—by using even an excess of reagent. The cryolite precipitates contained fluorine equivalent to 94 to 97 percent $Na_3AlF_6$, and 83 to 95 percent of the fluorine in the test solution was recovered. The recovery of fluorine as cryolite increased as the proportions of aluminum and sodium ions were increased. The sulfur and silica contents of the cryolite precipitates were well below the limits for specification-grade cryolite.

| Precipitation Weight ratio $F:P_2O_5$ | Reagents, percent [1] | | Cryolite Composition, percent | | | | | Recovery, percent | | |
|---|---|---|---|---|---|---|---|---|---|---|
| | Al | Na | $P_2O_5$ | F | Al | Na | Fe | F | Al | Na |
| 330 | 103 | 100 | 0.04 | 52.2 | | | | 95 | | |
| | 100 | 100 | 0.02 | | | | | | | |
| 200 | 100 | 100 | 0.05 | 52.5 | 13.1 | 31.7 | | 94 | 99 | 94 |
| | 95 | 95 | 0.03 | 51.4 | | | 0.05 | 89 | | |
| 150 | 100 | 100 | 0.06 | 52.4 | 13.0 | 31.4 | | 93 | 97 | 92 |
| | 95 | 95 | 0.02 | 51.7 | | | 0.02 | 88 | | |
| 125 | 100 | 100 | 0.07 | 52.5 | 13.4 | 31.4 | | 94 | 101 | 93 |
| 100 | 100 | 100 | 0.14 | | | | | | | |
| | 95 | 95 | 0.04 | 51.9 | | | 0.02 | 88 | | |
| 75 | 98 | 98 | 0.15 | | | | | | | |
| | 95 | 95 | 0.07 | 52.3 | | | | 89 | | |
| 60 | 98 | 98 | 0.17 | | | | | | | |
| | 95 | 95 | 0.07 | 52.6 | | | | 88 | | |
| 50 | 95 | 95 | 0.08 | 52.5 | | | | 88 | | |
| | 100 | 100 | 0.22 | | | | | | | |
| 40 | 95 | 95 | 0.12 | 51.1 | 13.3 | 31.7 | | 86 | 99 | 93 |
| | 90 | 90 | 0.09 | 51.4 | 13.5 | 30.4 | | 83 | 102 | 90 |
| | 90 | 90 | 0.07 | 52.3 | | | | 85 | | |
| 25 | 90 | 90 | 0.09 | 52.7 | | | | 85 | | |

[1] Basis, stoichiometric requirement in Equation 1 at the acidity and $F:P_2O_5$ ratios indicated.

From the above table it can be seen that in order to prepare cryolite of specification grade it is necessary to increase the percent of reagents aluminum and sodium as the weight ratio $F:P_2O_5$ is increased; or, conversely, as the $F:P_2O_5$ ratio decreases from about 125:1 down to 25:1 the percent of reagents aluminum and sodium added must be decreased to prevent $P_2O_5$ contamination from exceeding 0.1 percent.

*Example II*

The alkaline method for producing cryolite described above was tested also with a solution of ammonium and sodium fluorides as prepared from the recycled spray water used to condense phosphorus in the effluent gas from an electric smelting furnace.

A 5-gallon lot of recycle liquor obtained from the phosphorus condenser system was stored in a polyethylene carboy. The suspended solids (dust, phosphorus particles, etc.) were allowed to settle at room temperature. The supernatant liquor contained, in grams per liter: F, 83.7; $P_2O_5$, 45.9; $NH_3$, 45.8; and $SiO_2$, 42.3. In a series of bench-scale tests, the fluorine was precipitated as sodium silicofluoride by adding sodium chloride to the condenser liquor

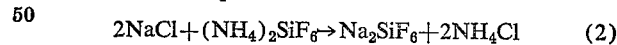

$$2NaCl + (NH_4)_2SiF_6 \rightarrow Na_2SiF_6 + 2NH_4Cl \quad (2)$$

Of the fluorine initially present in the test solution, 93 to 97 percent was precipitated when 125 to 200 percent of the theoretical amount of sodium chloride was used. The $P_2O_5$ content of the precipitates was about 0.1 percent. A batch of the sodium silicofluoride precipitate (F, 60.1; Na, 24.0; $SiO_2$, 31.5; $P_2O_5$, 0.1 percent) was decomposed, and silica precipitated with aqueous ammonia

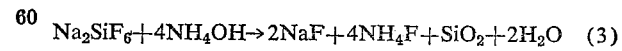

$$Na_2SiF_6 + 4NH_4OH \rightarrow 2NaF + 4NH_4F + SiO_2 + 2H_2O \quad (3)$$

The resulting solution of sodium fluoride and ammonium fluoride contained, in grams per liter: F, 27.8; Na, 11.1; $P_2O_5$, 0.5, and $SiO_2$, 0.17. The fluorine in the filtrate represented 92.5 percent of that in the silicofluoride used. Specification-grade sodium cryolite was prepared by the alkaline method from this solution.

We claim as our invention:

1. A process for the manufacture of cryolite of specification grade which comprises preparing an impure ammonium fluoride solution containing fluorine, phosphorus, silicon and iron compounds in such proportions that the weight ratio $F:P_2O_5$ is 25:1 to 125:1, the weight ratio of $F:SiO_2$ is at least 60:1, and the weight ratio of $F:Fe_2O_3$ is at least 100:1; heating the solution to boiling;

adding sodium hydroxide and a soluble aluminum salt to the solution in such proportions as to bring the sodium and aluminum content of the solution into the range from about 90 to 100 percent of the quantities theoretically required to form $Na_3AlF_6$ with all fluorine present in the solution; adjusting the quantities of said added sodium and aluminum in dependent relationship to the weight ratio $F:P_2O_5$ such that substantially 90 percent of said theoretical quantities is present at a weight ratio of about 25:1 and that the quantities of said added sodium and aluminum are simultaneously increased in proportionate relationship substantially corresponding to a proportional increase in the weight ratio $F:P_2O_5$ in said solution to a maximum of approximately 100 percent of the theoretical quantity as the weight ratio $F:P_2O_5$ becomes greater than about 125:1; neutralizing the solution to the phenolphthalein end point by addition of carbon dioxide; cooling the solution; separating a resulting precipitate of $Na_3AlF_6$; washing the precipitate; and receiving a cryolite of specification grade.

2. A process for the manufacture of cryolite of specification grade which comprises preparing an impure solution of ammonium fluoride containing fluorine, phosphorus silicon and iron compounds in such proportions that the weight ratio of $F:P_2O_5$ is in the range from 25:1 to 400:1, the weight ratio of $F:SiO_2$ is at least 60:1, and the weight ratio of $F:Fe_2O_3$ is at least 100:1, heating the solution to boiling; introducing sodium aluminate and sodium hydroxide into the boiling solution; controlling the quantities of aluminum and sodium introduced in the range from about 90 to 100 percent of the quantities theoretically required to form $Na_3AlF_6$ with all fluorine present in the solution adjusting the quantities of said added sodium and aluminum in dependent relationship to the weight ratio $F:P_2O_5$ such that substantially 90 percent of said theoretical quantities is present at a weight ratio of about 25:1 and that the quantities of said added sodium and aluminum are simultaneously increased in proportionate relationship substantially corresponding to a proportional increase in the weight ratio $F:P_2O_5$ in said solution to a maximum of approximately 100 percent of the theoretical quantity as the weight ratio $F:P_2O_5$ becomes greater than about 125:1; neutralizing the solution to the end point of phenolphthalein by addition of carbon dioxide; cooling the solution; separating a resulting precipitate of $Na_3AlF_6$; washing the precipitate; and receiving a cryolite of specification grade.

References Cited in the file of this patent

UNITED STATES PATENTS

| | | |
|---|---|---|
| 1,642,896 | Sander | Sept. 20, 1927 |
| 1,871,723 | Morrow | Aug. 16, 1932 |
| 2,075,370 | Strathmeyer | Mar. 30, 1937 |
| 2,728,634 | Miller | Dec. 27, 1955 |
| 2,780,524 | Gloss et al. | Feb. 5, 1957 |
| 2,816,818 | Gross | Dec. 17, 1957 |

FOREIGN PATENTS

| | | |
|---|---|---|
| 621,067 | France | May 4, 1927 |
| 876,558 | France | Nov. 10, 1942 |
| 1,010,504 | Germany | June 19, 1957 |

UNITED STATES PATENT OFFICE
CERTIFICATION OF CORRECTION

Patent No. 2,963,344            December 6, 1960

Grady Tarbutton et al.

It is hereby certified that error appears in the above numbered patent requiring correction and that the said Letters Patent should read as corrected below.

Column 2, line 17, for "evoved" read -- evolved --; line 21, for "larger" read -- large --; line 54, for "40:1" read -- 400:1 --; column 3, lines 46 and 47, for "material" read -- materials --; line 66, after "about" insert -- the --; column 5, line 31, for "liter; F." read -- liter: F, --; same line, for "S." read -- S, --; column 6, line 64, for "0.5" read -- 0.05 --.

Signed and sealed this 30th day of May 1961.

(SEAL)
Attest:

ERNEST W. SWIDER
Attesting Officer

DAVID L. LADD
Commissioner of Patents